Sept. 21, 1937. J. S. TRIPP Re. 20,514

REFLECTOR

Original Filed March 14, 1934

John S. Tripp. INVENTOR

BY Victor J. Evans & Co.

HIS ATTORNEYS

Reissued Sept. 21, 1937

Re. 20,514

UNITED STATES PATENT OFFICE 20,514

REFLECTOR

John S. Tripp, Chicago, Ill.

Original No. 2,071,243, dated February 16, 1937, Serial No. 715,529, March 14, 1934. Application for reissue July 21, 1937, Serial No. 154,932

4 Claims. (Cl. 88—101)

My invention relates to reflectors, and has among its objects and advantages the provision of an improved portable mirror. The invention embodies a mirror adjustably connected with a frame designed to be easily and quickly adjusted to the neck and breast of the user, to be supported thereby, for holding the mirror in front of the user. I provide means permitting the mirror support to be adjusted for attaining correct positioning of the mirror, and the mirror comprises two reflecting surfaces, one a plane mirror and the other a concave mirror.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which.

Figure 1:
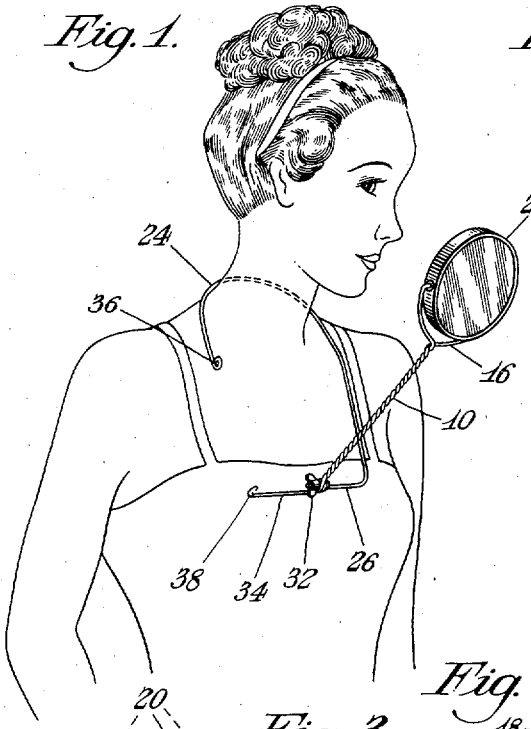
Fig. 1 is a perspective view illustrating the manner in which the mirror may be supported by the body of the user.
Figure 2:
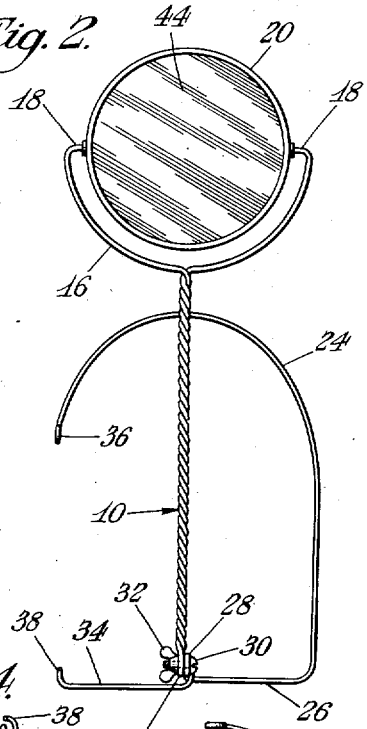
Fig. 2 is a front elevation.
Figure 3:
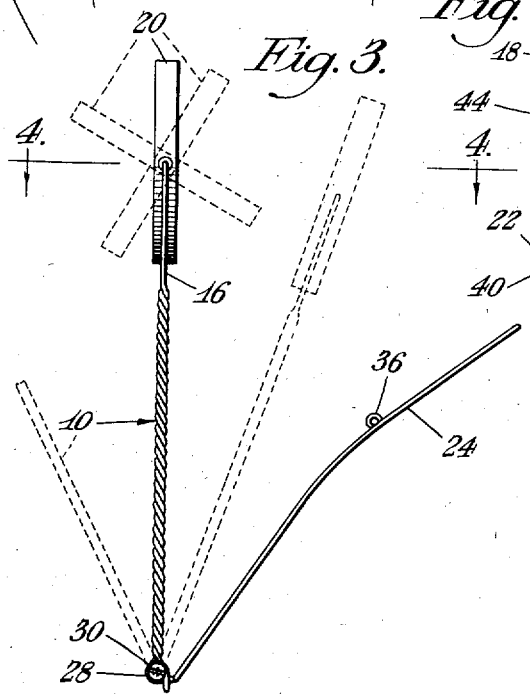
Fig. 3 is a side elevation.

In the embodiment selected to illustrate my invention, I make use of a standard 10 comprising a wire twisted upon itself to provide a loop 12. The two ends of the wire are separated and bent into the shape of a half circle 16, with short portions 18 arranged in axial alignment to provide bearings for a reflector 20 having sockets 22 arranged to loosely receive the bearings 18.

To support the device upon the neck and breast of the user, I make use of a wire hook 24 shaped to fit the neck, as illustrated in Fig. 1, and provided with a horizontal reach 26 bent to provide a loop 28 corresponding in size and shape to the loop 12. I adjustably connect the loop 12 with the loop 28 through the medium of a screw 30 provided with a wing nut 32. Thus, the angularity of the standard 10 may easily be adjusted by merely loosening the wing nut 32.

I extend the reach 26 as at 34 to provide additional support for the mirror. Without the extension 34 the weight of the mirror 20 tends to swing the standard slightly out of true vertical alignment. With the extension 34 the standard is held in true vertical alignment, thus holding the mirror directly in front of the user.

A loop 36 is formed upon the end of the hook 24, to provide an end of gentle curvature. Similarly, the end of the extension 34 is bent back at 38 to provide a similar formation, both of which prevent tearing of the wearer's clothing or scratching of the neck and breast. I space the end 36 sufficiently far from the end 38 to permit the hook to be easily passed over the neck of the wearer.

Figure 4:
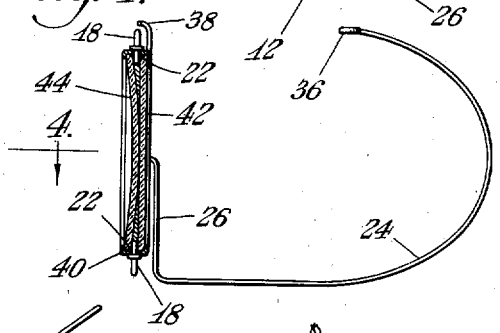
Fig. 4 is a sectional view taken along the line 4—4 of Fig. 3.
Figure 5:
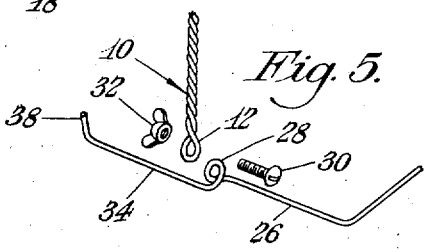
Fig. 5 is a detail view of some of the parts.

Referring to Fig. 4, the reflector 20 comprises a frame 40 supporting a plane mirror 42 and a concave mirror 44, either of which may be employed by rotating the reflector 20 approximately 180° about the axis of the bearing portions 18. The standard 10 is easily adjusted to position the reflector at the proper distance from the face of the user, while the pivotal mounting for the reflector permits easy adjustment of the reflector to its proper angle.

My device embodies a portable mirror eliminating the necessity for special supporting structures other than the neck and breast of the user. Thus, the coiffure and cosmetic make-up may be made at any place and need not be limited to locations having either special facilities for mounting of the mirror or permanently installed mirrors. A further unique advantage resides in the fact that the device may be used by duck hunters as a rear view mirror so that they may make observations in all directions without turning around and disturbing the game.

Without further elaboration the foregoing will so fully explain my invention that others may, by applying current knowledge, readily adapt the same for use under various conditions of service.

I claim:

1. In a portable mirror, a wire standard bent back upon itself to provide a loop and twisted together to provide a unitary construction, the ends of the wire being separated for connection with the mirror, a hook arranged to partly encircle the neck of the wearer, said hook being provided with a loop corresponding to the loop of said standard, and a fastening screw passing through said loops, to adjustably connect the standard with said hook.

2. In a portable mirror, a wire standard bent back upon itself to provide a loop and twisted together to provide a unitary construction, the ends of said wire being separated for connection with the mirror, a hook arranged to partly encircle the neck of the user, said hook being provided with a loop corresponding to the loop of said standard, and a fastening screw passing through said loops, to adjustably connect the standard with said hook, said hook being provided with a supporting reach arranged to rest on the breast of the user, to prevent swaying of the standard.

3. A portable mirror for connection with the body of the wearer, comprising a reflector, a standard movably connected with the reflector, and a single hook shaped to partly encircle the neck of the wearer and including a transverse bracing reach lying in the same plane as the hook and having pivotal connection between its ends with the lower end of said standard, said bracing reach being arranged to rest upon the breast of the wearer.

4. A portable mirror for connection with the body of the user, comprising a reflector, a standard member pivotally connected with the reflector, a single hook member shaped partly to encircle the neck of the user, a transverse bracing reach connected to one of said last two members and a pivotal connection between the other of said last two members and said transverse bracing reach, said pivotal connection being of a character to retain said standard and hook members in different angular positions with respect to each other, said transverse bracing reach extending transversely from the adjacent end of the hook member and arranged to rest upon the breast of the user.

JOHN S. TRIPP.